(12) United States Patent
Nemoto

(10) Patent No.: US 8,942,864 B2
(45) Date of Patent: Jan. 27, 2015

(54) VEHICLE CONTROL SYSTEM

(75) Inventor: Yusuke Nemoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 81 days.

(21) Appl. No.: 13/810,462

(22) PCT Filed: Jul. 25, 2011

(86) PCT No.: PCT/IB2011/001717
§ 371 (c)(1),
(2), (4) Date: Jan. 16, 2013

(87) PCT Pub. No.: WO2012/014040
PCT Pub. Date: Feb. 2, 2012

(65) Prior Publication Data
US 2013/0116861 A1   May 9, 2013

(30) Foreign Application Priority Data

Jul. 27, 2010 (JP) ................................. 2010-168633

(51) Int. Cl.
*G05D 1/00* (2006.01)
*G05D 3/00* (2006.01)
*B60K 31/00* (2006.01)
*B60W 30/16* (2012.01)
(Continued)

(52) U.S. Cl.
CPC ............ *B60K 31/0058* (2013.01); *B60W 30/16* (2013.01); *G08G 1/161* (2013.01); *G08G 1/22* (2013.01); *B60W 2550/302* (2013.01); *B60W 2550/408* (2013.01); *B60W 2720/106* (2013.01)
USPC ............................................................ 701/2

(58) Field of Classification Search
CPC .......... B60W 30/16; B60W 2250/302; B60W 2550/408; B60W 2720/106; B60W 30/02; B60K 31/0058; G08G 1/161; G08G 1/22
USPC ............................................................ 701/2
See application file for complete search history.

(56) References Cited

U.S. PATENT DOCUMENTS

| 5,781,119 | A | | 7/1998 | Yamashita et al. |
| 5,907,293 | A | * | 5/1999 | Tognazzini .................... 340/903 |
| 5,959,572 | A | * | 9/1999 | Higashimata et al. .......... 342/70 |

(Continued)

FOREIGN PATENT DOCUMENTS

| JP | A-63-98706 | 4/1988 |
| JP | A-5-170008 | 7/1993 |

(Continued)

*Primary Examiner* — Mary Cheung
*Assistant Examiner* — Anne Mazzara
(74) *Attorney, Agent, or Firm* — Oliff PLC

(57) ABSTRACT

A vehicle control system includes: a communication device provided in a vehicle to receive information relating to another vehicle from outside the vehicle; and a control device that performs travel control on the vehicle on the basis of information pertaining to a transfer function for a control target value used during travel control of the other vehicle and the control target value of the other vehicle, which is obtained via the communication device of the vehicle. Further, a vehicle control system includes: a communication device provided in a vehicle; and a control device that performs travel control using information relating to another vehicle, which is received from outside the vehicle via the communication device, wherein the communication device transmits information pertaining to a transfer function for a control target value used during the travel control.

15 Claims, 2 Drawing Sheets

(51) Int. Cl.
*G08G 1/16* (2006.01)
*G08G 1/00* (2006.01)

(56) References Cited

U.S. PATENT DOCUMENTS

| | | | |
|---|---|---|---|
| 6,473,686 B2 * | 10/2002 | Adachi et al. | 701/96 |
| 6,816,084 B2 * | 11/2004 | Stein | 340/903 |
| 7,382,274 B1 * | 6/2008 | Kermani et al. | 340/901 |
| 7,499,675 B2 * | 3/2009 | Tsuzuki et al. | 455/73 |
| 2002/0161506 A1 | 10/2002 | Ishizu et al. | |
| 2006/0015242 A1 * | 1/2006 | Yoshida | 701/96 |
| 2007/0198162 A1 * | 8/2007 | Kubota | 701/96 |

FOREIGN PATENT DOCUMENTS

| | | |
|---|---|---|
| JP | A-8-55300 | 2/1996 |
| JP | A-10-261195 | 9/1998 |
| JP | A-2008-59094 | 3/2008 |

* cited by examiner

VEHICLE CONTROL SYSTEM

BACKGROUND OF THE INVENTION

1. Field of the Invention

The invention relates to a vehicle control system that causes a host vehicle to travel on the basis of a relationship with another vehicle traveling near the host vehicle.

2. Description of Related Art

Conventional vehicle control systems of this type are disclosed in Japanese Patent Application Publication No. 2008-059094 (JP-A-2008-059094) and Japanese Patent Application Publication No. 63-098706 (JP-A-63-098706), for example. JP-A-2008-059094 discloses a technique relating to vehicle interval control in which a target speed and a target acceleration/deceleration of a certain vehicle in a vehicle group are set on the basis of a target speed and a target acceleration/deceleration of another vehicle in the vehicle group, the set target speed and target acceleration/deceleration are transmitted to the vehicle by communication, and the vehicle is subjected to travel control so that the speed and acceleration/deceleration of the vehicle match the target speed and target acceleration/deceleration. JP-A-63-098706, meanwhile, discloses a technique relating to vehicle interval control in which vehicle-to-vehicle communication is performed between at least two vehicles and travel control is performed on a host vehicle on the basis of a received target acceleration of the other vehicle.

Incidentally, a response delay may occur in a vehicle between a point at which a control command for attaining a control target value such as a target vehicle acceleration is issued and a point at which an actual output matches the control target value an actual output, depending on a control response characteristic of the actual output value relative to the control target value. Therefore, when the host vehicle is travel-controlled on the basis of the control target value of the other vehicle, it may be impossible to perform the travel control appropriately, depending on the control response characteristic relative to the control target value. In the vehicle interval control described above, for example, a target vehicle acceleration and a target vehicle speed of a following vehicle may deviate from desired control target values relative to an actual vehicle acceleration and an actual vehicle speed of a preceding vehicle, and as a result, an ability of the following vehicle to follow the preceding vehicle may deteriorate.

SUMMARY OF THE INVENTION

The invention provides a vehicle control system capable of improving the control precision of travel control that is performed on a host vehicle on the basis of a relationship thereof to another vehicle.

A first aspect of the invention is a vehicle control system including: a communication device provided in a vehicle to receive information relating to another vehicle from outside the vehicle; and a control device that performs travel control on the vehicle on the basis of information pertaining to a transfer function for a control target value used during travel control of the other vehicle and the control target value of the other vehicle, which is obtained via the communication device of the vehicle.

the control device may performs the travel control on the basis of specification information relating to the other vehicle, which is obtained via the communication device.

The information pertaining to the transfer function of the other vehicle may be obtained via the communication device of the vehicle.

The control device may calculate the information pertaining to the transfer function of the other vehicle on the basis of the control target value of the other vehicle and a measured value of an actual output relative to the control target value of the other vehicle.

The measured value of the actual output of the other vehicle may be measured by the other vehicle, and the vehicle may obtain the measured value of the actual output of the other vehicle via the communication device.

The vehicle control system may further include a measurement device that measures the actual output relative to the target value of the other vehicle.

The control device may perform the travel control on the basis of information pertaining to the transfer function of the vehicle.

The control device may calculate an actual output value for the control target value of the other vehicle using the information pertaining to the transfer function of the other vehicle and the control target value of the other vehicle, and may obtain a control target value used during the travel control of the vehicle on the basis of the actual output value of the other vehicle.

The control device may compare specification information relating to the other vehicle, which is obtained via the communication device, and the specification information relating to the vehicle to determine a characteristic difference in output characteristics or deceleration characteristics between the vehicle and the other vehicle, and may obtain the control target value of the vehicle on the basis of the characteristic difference.

The control device may corrects the control target value of the vehicle on the basis of the characteristic difference.

The control device may calculate the control target value of the vehicle using the actual output of the other vehicle and information pertaining to the transfer function of the vehicle.

The vehicle control system may further include a measurement device that measures an actual output for the control target value of the vehicle, and the control device may calculate the information pertaining to the transfer function of the vehicle using the actual output of the vehicle and the control target value of the vehicle.

A second aspect of the invention is a vehicle control system including: a communication device provided in a vehicle; and a control device that performs travel control using information relating to another vehicle, which is received from a vehicle exterior via the communication device, wherein the communication device transmits information pertaining to a transfer function for a control target value used during the travel control.

The information pertaining to the transfer function may be a time constant.

The vehicle control system according to the invention performs travel control on the host vehicle using the information pertaining to the transfer function, which indicates a control response characteristic relative to the control target value used in the travel control of the other vehicle. Therefore, the actual output of the other vehicle relative to the control target value can be learned in the host vehicle with a high degree of precision, and as a result, an improvement is achieved in the control precision of the travel control performed in the host vehicle with respect to the other vehicle. Further, in the vehicle control system according to the invention, the information pertaining to the transfer function for the control target value used during the travel control of the host vehicle is transmitted from the host vehicle so as to be receivable by the other vehicle. Therefore, the other vehicle can be notified of the actual output of the host vehicle relative to the control target value with a high degree of precision, and as a result, an improvement is achieved in the control precision of the travel control performed in the other vehicle with respect to the host vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of a vehicle control system according to the invention will be described in detail below on the basis of the drawings. Note that the invention is not limited by this embodiment.

Figure 1:
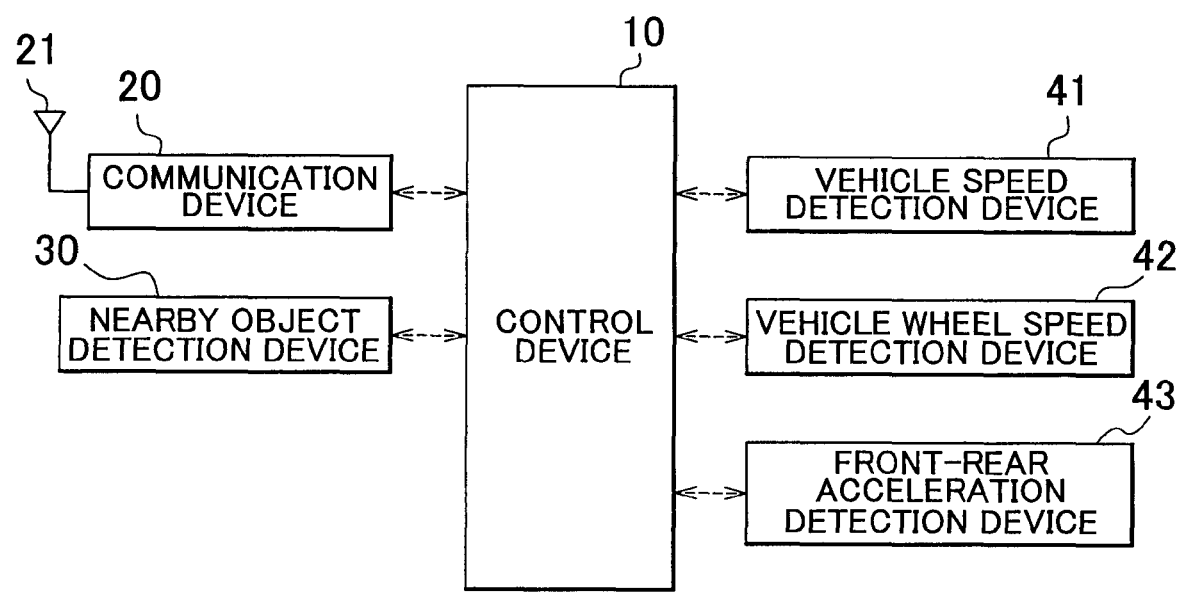
FIG. 1 is a view showing the constitution of a vehicle control system according to an embodiment of the invention.
Figure 2:
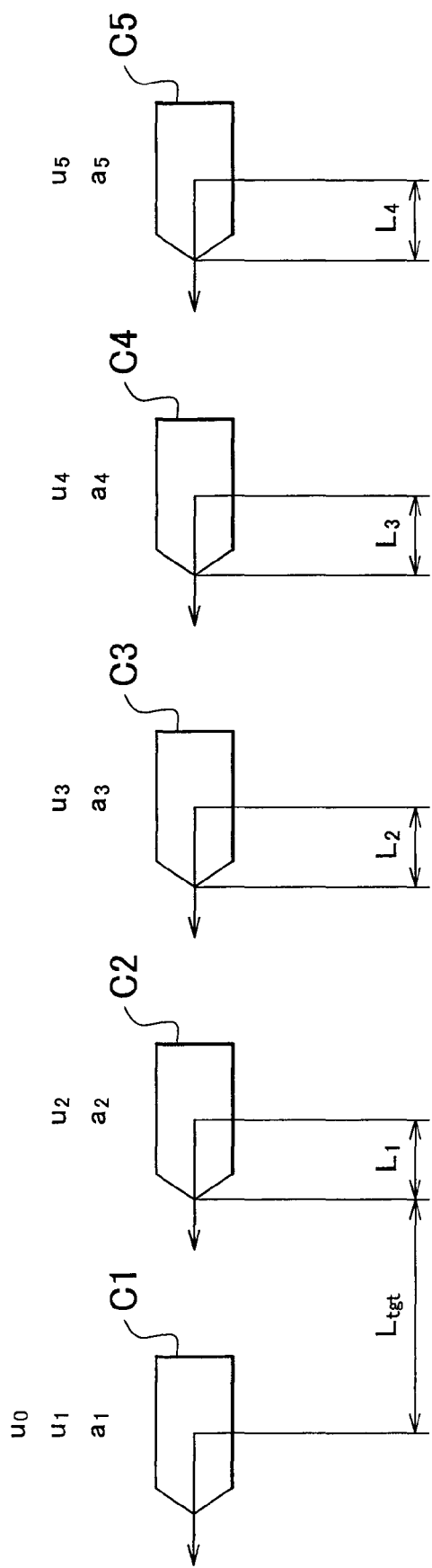
FIG. 2 is a view illustrating linear quadratic (LQ) control.

An embodiment of the vehicle control system according to the invention will now be described on the basis of FIGS. 1 and 2.

A vehicle control system according to this embodiment is capable of transmitting and receiving information relating to respective vehicles to and from nearby vehicles using wireless communication, and executing travel control using host vehicle and other vehicle information shared by the respective vehicles. Here, vehicle interval control between a plurality of vehicles will be used as an example of the travel control. In other words, in this example, the vehicle control system is applied to a vehicle interval automatic control system to be described below. This system is realized by installing constitutional elements (a vehicle control apparatus) shown in FIG. 1 in a vehicle. In this example, the constitutional elements shown in FIG. 1 are installed in both a host vehicle according to the system and another vehicle near the host vehicle (a preceding vehicle and a following vehicle, for example). A control operation according to the system is executed by a control device (an ECU) 10 shown in FIG. 1.

The vehicle interval automatic control system performs so-called Adaptive Cruise Control (ACC) to control the vehicle interval to a set target inter-vehicle distance and a set target inter-vehicle time. By shortening the vehicle interval to achieve the target inter-vehicle distance and target inter-vehicle time, the vehicle interval automatic control system is capable of reducing air resistance received by the following vehicle, and as a result, a fuel efficiency of the following vehicle can be improved. Further, by shortening the vehicle interval, the vehicle interval automatic control system can increase a number of vehicles passing a certain point on a road per unit time (a so-called traffic capacity), which is useful in alleviating road congestion.

The vehicle interval control executed by the vehicle interval automatic control system according to this example is not limited to vehicle interval control between a front-rear pair of vehicles, which is performed when following a single preceding vehicle or when being followed by a single following vehicle, and also includes vehicle interval control executed on each of a plurality of vehicles forming a single platoon (a vehicle group) during platooning, in which the vehicles travel in a platoon while following a preceding vehicle or being followed by a following vehicle.

In the vehicle interval automatic control system, various information is exchanged between the vehicles using a vehicular wireless communication technique, and a control target value of the vehicle interval control is set on the basis of the information or information required for vehicle interval control included in the information. The vehicle interval automatic control system then executes vehicle control corresponding to the control target value, whereby the vehicle interval is controlled to match a target inter-vehicle distance (a target inter-vehicle time) serving as a control target value. In other words, the vehicle interval automatic control system executes information communication type vehicle interval control (ACC, for example).

A communication device 20 that performs vehicular wireless communication is connected to the control device 10. The communication device 20 is controlled by the control device 10 to transmit various information to be described below (identification information, travel information, control target value information, driver operation information, vehicle specification information, communication standard information, travel environment information, and so on), which is exchanged between the vehicles in the vehicle interval automatic control system, from an antenna 21.

The following types of communication may be used as the vehicular wireless communication. For example, this type of wireless communication includes communication in which information is exchanged between vehicles directly and communication in which information is exchanged between vehicles indirectly via a communication facility laid on the outside of the vehicles. Vehicle-to-vehicle communication, in which information is exchanged between vehicles directly, may be cited as an example of the former type of wireless communication. Vehicle-road-vehicle communication, in which information is exchanged between vehicles via a communication facility (a roadside device) laid on the outside of the vehicles, and communication in which information is exchanged between the vehicles using a communication infrastructure such as the Internet via a communication facility (a base station such as an information center) laid on the outside of the vehicles, may be cited as examples of the latter type of wireless communication. During platooning, both the immediately preceding vehicle and any other preceding vehicles in the vehicle group and both the immediately following vehicle and any other following vehicles in the vehicle group may serve as a communication partner, regardless of whether information is exchanged directly or indirectly.

The vehicle-road-vehicle communication described above is an example of an application of road-vehicle communication in which information is exchanged between the communication device 20 of the vehicle and the communication facility (roadside device) laid on the outside of the vehicle. Road-vehicle communication is used when the vehicle receives information such as congestion conditions and traffic signal conditions relating to the road ahead.

Examples of the various information exchanged between the vehicles include identification information, travel information, control target value information, driver operation information, vehicle specification information, communication standard information, travel environment information, and so on. Detection devices and the like for obtaining this information are installed in the vehicle. The information (detection signals or the like) obtained by the detection devices and so on is transmitted to the control device 10.

The identification information is information for specifying and identifying an information transmission source. In the vehicle interval automatic control system, vehicle identification information for specifying and identifying the vehicle itself is set in the vehicle in advance. Note that the vehicle identification information may be conveyed at the time of communication. During platooning, vehicle group identification information for specifying and identifying the vehicle group may also be conveyed. The vehicle group identification information is set by the control device 10 of one of the vehicles belonging to the vehicle group (a leading vehicle, for example) at the start of the platooning, for example, and conveyed to the respective vehicles through wireless communication. During platooning, variation may occur in the vehicles belonging to the vehicle group when a new vehicle joins the group, when a vehicle leaves the group, and so on. In the vehicle interval automatic control system, new vehicle group identification information may be conveyed anew when variation occurs in the vehicles belonging to the vehicle group. Alternatively, when a new vehicle joins the vehicle group, pre-existing vehicle group identification information may be conveyed to the newly joined vehicle. When a vehicle leaves the vehicle group, on the other hand, the vehicle group identification information held in the departing vehicle is deleted by the control device 10 of the departing vehicle.

The travel information is measured information and estimated information obtained as the host vehicle travels. Examples of the travel information include information indicating a current position and an advancement direction of the host vehicle. Measured information obtained by a Global Positioning System (GPS) 31, for example, may be used as the current position information. The advancement direction information may be estimated from change in the measured information obtained by the GPS 31 or estimated on the basis of information indicating a directional indicator operation direction and a steering angle, to be described below, for example. Map information from a navigation system 32 may be used together with the estimated information obtained by the GPS 31 as the current position information and the advancement direction information. The travel information may also include vehicle speed information relating to the host vehicle, vehicle acceleration information (vehicle deceleration information) relating to the host vehicle, vehicle lateral acceleration information relating to the host vehicle, jerk information relating to the host vehicle, yaw rate information relating to the host vehicle, pitch angle information relating to the host vehicle, and roll angle information relating to the host vehicle. This travel information is obtained on the basis of detection values from various sensors installed in the host vehicle, such as a vehicle speed sensor (a vehicle speed detection device 33) and an acceleration sensor.

The control target value information is information indicating control target values of the host vehicle required to perform vehicle interval control with another vehicle. The control target value information includes information indicating the aforesaid target inter-vehicle distance and target inter-vehicle time, and information such as a target vehicle speed, a target vehicle acceleration or target vehicle deceleration (to be referred to hereafter as a "target vehicle acceleration/deceleration"), a target jerk, and a target driving force of a drive source, all of which are set in relation to the host vehicle in order to realize the target inter-vehicle distance and target inter-vehicle time. The control device 10 sets the control target values pertaining to the vehicle interval control on the basis of the received other vehicle information and so on.

The driver operation information includes information indicating an amount by which the driver operates an input device of the host vehicle and information indicating whether or not the input device has been operated. The former operation amount information includes information indicating an accelerator operation amount (an throttle valve opening or the like) of an accelerator pedal, information indicating a brake operation amount (a brake pressure or the like) of a brake pedal, operation direction information indicating whether a directional indicator has been operated to the left or the right, information indicating a steering angle of a steering wheel, information indicating an operating condition of a headlamp switch (information indicating whether the headlamp is at high beam, low beam, or small beam), and so on. The latter operation information, meanwhile, includes information indicating whether or not the brake has been operated (whether a brake lamp switch is ON or OFF), information indicating whether or not the directional indicator has been operated, information indicating whether or not the headlamp switch has been operated, information indicating whether or not a wiper switch has been operated, information indicating whether or not a switch operation has been performed on another device such as an air-conditioner or audio equipment, and so on.

The vehicle specification information includes information indicating a model and a manufacturer. Here, the information indicating the model and manufacturer may be included in the vehicle identification information described above. Thus, the control device 10 need reference only one of the vehicle specification information and the vehicle identification information in order to use the information indicating the model and manufacturer. The vehicle specification information includes not only information determined in advance as design values of the vehicle, but also information that does not exhibit frequent variation. For example, the specification information includes a vehicle weight, a maximum vehicle braking force (a maximum vehicle deceleration, which is dependent on a road surface friction coefficient), a maximum accelerating force (a maximum vehicle acceleration), a maximum jerk, vehicle response characteristic information, a responsiveness of various actuators (a response speed to a control command), equipment information, and so on. The actuators include a brake actuator, a throttle actuator, a transmission actuator, and so on. Further, the equipment information includes a tire gripping performance and so on, for example.

The vehicle response characteristic information is information pertaining to a transfer function G (s) that indicates a control response characteristic relative to the control target values of the vehicle, or in other words information pertaining to an output responsiveness (a control response characteristic) exhibited during control of the drive source, the actuators, and so on at the control target values. The information pertaining to the transfer function G (s) may be constituted by the transfer function G (s) itself, as shown in a following Equation 1, for example, or a time constant Ts relating to the transfer function G (s). Alternatively, the information pertaining to the transfer function G (s) may be constituted by a map corresponding to the transfer function G (s). The time constant Ts is a value specific to each vehicle. In Equation 1, "s" is a Laplacian operator.

$$G(s) = \frac{1}{1 + Ts * s} \tag{1}$$

Using the transfer function G (s) of Equation 1, the control response characteristic of an actual vehicle acceleration/deceleration $a_{actual}$ relative to a target vehicle acceleration/deceleration $u_{target}$ is as shown in a following Equation 2.

$$a_{actual} = G(s) * u_{target} = \frac{1}{1 + Ts * s} u_{target} \quad (2)$$

The communication standard information is information indicating a communication standard for two way wireless communication, a communication standard for a wireless local area network (LAN), a communication standard for a beacon, or the like, for example. Two-way communication performed during vehicular wireless communication includes Dedicated Short Range Communication (DSRC) and so on. The communication standard information also includes greeting information transmitted to a transmission destination, time constant information indicating a response delay in the various actuators described above, a flag indicating transfer information, and so on.

The travel environment information is information indicating the road surface along which the host vehicle is traveling. The travel environment information includes information indicating the road surface friction coefficient, information indicating a road surface gradient, information indicating a road surface temperature, information indicating whether the road surface is asphalted or unpaved, and information indicating whether the road surface is wet, dry, or frozen.

The control target values set during the vehicle interval control are principally the target inter-vehicle distance and the target inter-vehicle time, which serve as the main targets of the vehicle interval control. The target inter-vehicle distance (target inter-vehicle time) is set on the basis of current values of the relative speed, the inter-vehicle distance, the relative vehicle acceleration/deceleration, and so on between vehicles at a value which ensures that the inter-vehicle distance does not reach zero even if the preceding vehicle brakes rapidly or the like, for example. The relative speed and so on are calculated on the basis of received information relating to the preceding vehicle (information indicating the vehicle speed, position, and so on). According to this vehicle interval automatic control system, the target vehicle speed, target vehicle acceleration/deceleration, target jerk, target driving force, and so on are set as actual control target values for the vehicle to be controlled on the basis of the target inter-vehicle distance (target inter-vehicle time).

In this vehicle interval automatic control system, when a nearby object detection device 30 installed in the host vehicle detects another vehicle, the other vehicle is determined to be a vehicle that may serve as a partner during platooning (following travel). At this time, information may be transmitted from the host vehicle to the other vehicle, for example, in order to start information communication type inter-vehicle control between the vehicles. Further, when the nearby object detection device 30 detects a new vehicle in front of or behind the host vehicle during platooning control, information may be transmitted to the new vehicle such that information communication type inter-vehicle control is executed on the new platoon from the point at which the information is shared between the vehicles. When the nearby object detection device 30 detects the departure of another vehicle from the platoon, on the other hand, information communication type inter-vehicle control may be executed on the new platoon having a reduced number of vehicles.

The nearby object detection device 30 is a device for detecting objects near the host vehicle, which is used to detect another vehicle near the host vehicle. The control device 10 detects another vehicle near the host vehicle using a detection result from the nearby object detection device 30. The nearby object detection device 30 is disposed in a location enabling detection of another vehicle in a monitoring direction such as the front, rear, or sides of the host vehicle. In other words, the nearby object detection device 30 is disposed on a front portion of the host vehicle if the front of the host vehicle is to be monitored, on a rear portion of the vehicle if the rear of the host vehicle is to be monitored, and on a right side portion and a left side portion of the host vehicle if the sides of the host vehicle are to be monitored.

A millimeter wave radar, an inexpensive laser radar, a close range radar such as an Ultra Wide Band (UWB) radar, a sonar using audible sound waves or ultrasonic waves, an image capturing device, and so on, for example, may be used as the nearby object detection device 30. Specific examples of the image capturing device include a visible light camera, an infrared camera (either including or not including an infrared projector), a single camera, a stereo camera, and so on. When a radar device (a millimeter wave radar, a laser radar, or a close range radar) or a sonar is used, the control device 10 of the host vehicle detects a preceding vehicle on the basis of a detection signal therefrom and then calculates the inter-vehicle distance, relative speed, relative acceleration, and so on relative to the preceding vehicle. When an image capturing device is used, the control device 10 of the host vehicle detects a preceding vehicle on the basis of a captured image and then calculates the inter-vehicle distance, relative speed, and so on relative to the preceding vehicle. Note that when position information relating to the preceding vehicle can be obtained from a global positioning system (GPS), the relative positional relationship between the host vehicle and the preceding vehicle may be determined on the basis of position information relating to the preceding vehicle and position information relating to the host vehicle using the GPS.

In this vehicle interval automatic control system, when two or more vehicles travel in a platoon, a following vehicle receives the control target values (the target vehicle speed, target vehicle acceleration/deceleration, target jerk, target driving force, and so on) of at least the preceding vehicle through wireless communication. The preceding vehicle may be an immediately preceding vehicle or a vehicle traveling further ahead. Further, the control target values of a following vehicle may be received in addition to those of the preceding vehicle. Note that in this example, the target inter-vehicle distance (target inter-vehicle time) is assumed to be determined in advance according to rules of the system, for example.

The control device 10 of the following vehicle refers to the control target values (the target vehicle speed, target vehicle acceleration/deceleration, target jerk, target driving force, and so on) of the preceding vehicle to set control target values (a target vehicle acceleration/deceleration and a target jerk) of the host vehicle in order to bring the actual inter-vehicle distance close to the target inter-vehicle distance and set a control target value (a target vehicle speed) of the host vehicle at an identical vehicle speed to the preceding vehicle in order to maintain the target inter-vehicle distance, for example.

Here, the vehicles have the control response characteristic described above. Therefore, even when the control device 10 of the following vehicle obtains the control target values (the target vehicle speed, target vehicle acceleration/deceleration, target jerk, target driving force, and so on) of the preceding vehicle through communication, it is impossible to learn actual outputs (the actual vehicle speed, actual vehicle acceleration/deceleration, actual jerk, actual driving force, and so on) of the preceding vehicle from the obtained control target values. Hence, the control device 10 of the following vehicle determines the actual outputs of the preceding vehicle taking into account the aforementioned information pertaining to the transfer function G (s) (the transfer function G (s), the time constant Ts, or the map) of the preceding vehicle, and sets the control target values (the target vehicle speed, target vehicle acceleration/deceleration, target jerk, target driving force, and so on) of the host vehicle on the basis of the determined actual outputs.

Here, the vehicle acceleration/deceleration will be used as an example. The control device 10 of the following vehicle (the host vehicle) can determine the actual vehicle acceleration/deceleration $a_{actual}$ of the preceding vehicle by substituting the transfer function G (s) of the preceding vehicle and the target vehicle acceleration/deceleration $u_{target}$ of the preceding vehicle, received by the communication device 20, into Equation 2. If the transfer function G (s) is received by the following vehicle during this calculation, the transfer function G (s) may be substituted into Equation 2. Alternatively, if the time constant Ts is received by the following vehicle, the transfer function G (s) may be determined from the time constant Ts and substituted into Equation 2. When the vehicle acceleration/deceleration of the preceding vehicle changes during platooning (following travel) at the target inter-vehicle distance, for example, the control device 10 sets the determined actual vehicle acceleration/deceleration $a_{actual}$ of the preceding vehicle as the target vehicle acceleration/deceleration $u_{target}$ of the host vehicle, and controls the output of the drive source and so on and a braking force of a brake device so that the host vehicle is controlled to travel at the target vehicle acceleration/deceleration $u_{target}$. Hence, the following vehicle follows the preceding vehicle while accelerating or decelerating at an identical vehicle acceleration/deceleration to the preceding vehicle, and as a result, the target inter-vehicle distance is maintained.

When the preceding vehicle exhibits identical output characteristics (output values, output responsiveness, and so on) and/or deceleration characteristics (the braking force and the output responsiveness thereof) to the host vehicle, for example, the transfer functions G (s) and time constants Ts of the preceding vehicle and the host vehicle take identical values. In this case, the target vehicle acceleration/deceleration $u_{target}$ of the host vehicle may be set using the information pertaining to the transfer function G (s) of the preceding vehicle, whereupon the output of the drive source and so on and the braking force of the brake device are controlled in accordance with the target vehicle acceleration/deceleration $u_{target}$. In so doing, the host vehicle can be accelerated and decelerated with favorable responsiveness to the vehicle acceleration/deceleration of the preceding vehicle.

When differences exist between the output characteristics and/or deceleration characteristics of the preceding vehicle and the host vehicle, on the other hand, and particularly when the preceding vehicle and the host vehicle have a relationship whereby one is a high performance vehicle such as a sports car and the other is a typical standard vehicle, for example, the following situations may arise. When the host vehicle exhibits superior output characteristics and/or deceleration characteristics to the preceding vehicle, the responsiveness of the transfer function G (s) and the time constant Ts is higher in the host vehicle than in the preceding vehicle. In this case, the target vehicle acceleration/deceleration $u_{target}$ of the host vehicle may be set using the information pertaining to the transfer function G (s) of the preceding vehicle, whereupon the output of the drive source and so on and the braking force of the brake device are controlled in accordance with the target vehicle acceleration/deceleration $u_{target}$. In so doing, the host vehicle can be accelerated and decelerated with favorable responsiveness to the vehicle acceleration/deceleration of the preceding vehicle. When the preceding vehicle exhibits superior output characteristics and/or deceleration characteristics to the host vehicle, on the other hand, the responsiveness of the transfer function G (s) and the time constant Ts is higher in the preceding vehicle than in the host vehicle. In this case, if the target vehicle acceleration/deceleration $u_{target}$ of the host vehicle is set using the information pertaining to the transfer function G (s) of the preceding vehicle, the target vehicle acceleration/deceleration $u_{target}$ may exceed a vehicle acceleration/deceleration range that can be output by the host vehicle.

Hence, when setting the target vehicle acceleration/deceleration $u_{target}$ of the host vehicle, the output characteristics and/or deceleration characteristics of the preceding vehicle and the host vehicle are preferably compared. Differences between the output characteristics and/or deceleration characteristics of the preceding vehicle and the host vehicle may be determined by comparing the vehicle specification information such as the model and manufacturer, and in particular the information indicating the model. Accordingly, the specification information of the preceding vehicle is preferably used when setting the target vehicle acceleration/deceleration $u_{target}$ of the host vehicle. For example, a model comparison with the host vehicle is performed on the basis of the specification information of the preceding vehicle to learn the output characteristics and/or deceleration characteristics of the preceding vehicle relative to those of the host vehicle. When the preceding vehicle exhibits output characteristics and/or deceleration characteristics of an equal or lower level to those of the host vehicle, it is determined that the host vehicle can be accelerated and decelerated in accordance with the movement of the preceding vehicle, and therefore the target vehicle acceleration/deceleration $u_{target}$ of the host vehicle is set using the information pertaining to the transfer function G (s) of the preceding vehicle. As a result, the host vehicle can be caused to follow the preceding vehicle at an identical vehicle acceleration/deceleration to the preceding vehicle. When the preceding vehicle exhibits output characteristics and/or deceleration characteristics of at least a predetermined higher level than the host vehicle, on the other hand, it is determined that it may be impossible to accelerate and decelerate the host vehicle in accordance with the movement of the preceding vehicle, and accordingly, the control for causing the host vehicle to follow the preceding vehicle may be halted. Further, when the preceding vehicle exhibits higher output characteristics and/or deceleration characteristics than the host vehicle but the difference therebetween is lower than the predetermined level, it may be possible to accelerate and decelerate the host vehicle in accordance with the movement of the preceding vehicle. In this case, the target vehicle acceleration/deceleration $u_{target}$ of the host vehicle may be set using the information pertaining to the transfer function G (s) of the preceding vehicle as is. Note that when information indicating the output characteristics and/or deceleration characteristics is included in the specification information of the vehicle, the information indicating the output characteristics and/or deceleration characteristics may be compared directly.

Further, the information pertaining to the transfer function G (s), which indicates the control response characteristics relative to the control target values of the host vehicle, is preferably taken into account when setting the target vehicle acceleration/deceleration $u_{target}$ of the host vehicle. At this time, the control device 10 of the following vehicle (the host vehicle) may determine the target vehicle acceleration/deceleration $u_{target}$ of the host vehicle by substituting the determined actual vehicle acceleration/deceleration $a_{actual}$ of the preceding vehicle into a modification of Equation 2 so that a target vehicle acceleration/deceleration $u_{target}$ of the host vehicle which takes into account the control response characteristics of the host vehicle is set. The target vehicle acceleration/deceleration $u_{target}$ of the host vehicle set in this manner is even closer to the actual vehicle acceleration/deceleration $a_{actual}$ of the preceding vehicle. Hence, the following vehicle can follow the preceding vehicle at a more precise vehicle acceleration/deceleration, and therefore the following vehicle can be accelerated and decelerated more precisely in accordance with the vehicle acceleration/deceleration of the preceding vehicle, leading to an improvement in the precision with which the target inter-vehicle distance is maintained.

Hence, according to this vehicle interval automatic control system, the information pertaining to the transfer function G (s), which indicates the control response characteristics of the other vehicle relative to the control target values, is taken into account in addition to the control target values of the other vehicle obtained through wireless communication, and therefore the actual outputs of the other vehicle relative to the control target values can be determined more accurately. Furthermore, in the host vehicle, the control target values of the host vehicle can be set at appropriate values corresponding to current conditions on the basis of the actual outputs of the other vehicle determined in this manner, and therefore the actual host vehicle can be travel-controlled appropriately. According to this vehicle interval automatic control system, the information pertaining to the transfer function G (s) of the host vehicle is also taken into account, and therefore the control target values of the host vehicle can be set with a higher degree of precision. As a result, appropriate travel control corresponding to current conditions can be performed between the vehicles with a higher degree of precision.

The information pertaining the transfer function G (s) used here may be shared between the vehicles in the platoon by transmitting and receiving the transfer function G (s) itself or the time constant Ts between the vehicles through wireless communication, as described above. However, the transfer function G (s) or the time constant Ts may vary due to temporal variation or the like in the drive source, the actuators, and so on, for example. Therefore, when the transfer function G (s) or the time constant Ts varies in a vehicle that is constituted to transmit a predetermined transfer function G (s) or time constant Ts, the actual outputs of the transmission source vehicle relative to the control target values cannot be determined correctly.

Hence, in this vehicle interval automatic control system, measures are preferably taken to ensure that a current transfer function G (s) or time constant Ts of the vehicle can be estimated.

The control target values (the target vehicle speed, target vehicle acceleration/deceleration, target jerk, target driving force, and so on) of the host vehicle are held in the host vehicle. Further, the actual vehicle speed, actual vehicle acceleration/deceleration, and actual jerk of the host vehicle are preferably determined in the host vehicle on the basis of detection signals from a vehicle speed detection device (a vehicle speed sensor or the like) 41 and a vehicle wheel speed detection device (a vehicle wheel speed sensor or the like) 42 of the host vehicle, for example. Alternatively, the actual vehicle speed, actual vehicle acceleration/deceleration, and actual jerk of the host vehicle may be determined on the basis of a detection signal from a front-rear acceleration detection device (a front-rear acceleration sensor or the like) 43 of the host vehicle. Hence, in the host vehicle, the current transfer function G (s) or time constant Ts of the host vehicle can be estimated on the basis of the control target values of the host vehicle and the detected actual outputs of the host vehicle. For example, the control device 10 of the host vehicle can estimate the transfer function G (s) or the time constant Ts of the host vehicle by substituting the target vehicle acceleration/deceleration $u_{target}$ and the actual vehicle acceleration/deceleration $a_{actual}$ into a modification of Equation 2.

Hence, when the newly estimated transfer function G (s) or time constant Ts of the host vehicle differs from the transfer function G (s) or time constant Ts of the host vehicle stored in a storage device, the control device 10 can use the new transfer function G (s) or time constant Ts as a more correct, current transfer function G (s) or time constant Ts of the host vehicle (i.e., the stored transfer function G (s) or time constant Ts can be replaced with the estimated transfer function G (s) or time constant Ts of the host vehicle). In this vehicle interval automatic control system, the current transfer function G (s) or time constant Ts of the host vehicle is transmitted by the communication device 20. As a result, the actual outputs of the host vehicle relative to the control target values can be calculated correctly in the other vehicle, enabling appropriate travel control.

Further, according to this vehicle interval automatic control system, as described above, the control target values of a certain vehicle can be learned by another vehicle in the platoon through wireless communication. Hence, if the actual outputs (the actual vehicle speed, actual vehicle acceleration/deceleration, actual jerk, actual driving force, and so on) of the vehicle relative to the control target values are obtained, the current transfer function G (s) or time constant Ts of the vehicle can be estimated in another vehicle on the basis of the control target values and the measured values of the actual outputs.

The actual outputs of the other vehicle relative to the control target values, or in other words actual travel information relating to the other vehicle, may be measured by providing an other vehicle travel information detection device in the host vehicle. The other vehicle travel information detection device is capable of detecting information for estimating the actual travel information (vehicle speed, vehicle acceleration/deceleration, and so on) of the other vehicle, and the nearby object detection device 30 described above may be used. As described above, the control device 10 calculates the inter-vehicle distance, the relative speed, the relative acceleration, and the like on the basis of detection signals from the nearby object detection device 30. On the basis of the detection signals, the control device 10 determines the actual vehicle speed and vehicle acceleration/deceleration of the other vehicle. Further, the control device 10 may determine the actual jerk of the other vehicle on the basis of the vehicle speed and so on. Hence, according to this example, the control device 10 of the host vehicle estimates the current transfer function G (s) or time constant Ts of the other vehicle on the basis of the received control target values (the target vehicle speed, target vehicle acceleration/deceleration, and target jerk) of the other vehicle and the actual outputs (the actual vehicle speed, actual vehicle acceleration/deceleration, and actual jerk) of the other vehicle, which are measured by the host vehicle upon reception of the control target values. For example, the control device 10 of the host vehicle can estimate the current transfer function G (s) or time constant Ts of the other vehicle by substituting the target vehicle acceleration/deceleration $u_{target}$ and the actual vehicle acceleration/deceleration $a_{actual}$ into a modification of Equation 2. On the other hand, the measured values of the actual outputs of the other vehicle may be measured by the other vehicle itself rather than the host vehicle and then received through wireless communication.

In this vehicle interval automatic control system, for example, the transfer function G (s) or time constant Ts of the other vehicle received through wireless communication is compared with the transfer function G (s) or time constant Ts of the other vehicle estimated by the host vehicle, and when a difference exists in the values thereof, it may be determined that the control response characteristic of the other vehicle has changed. When this determination is made, the control device 10 of the host vehicle may determine the actual outputs of the other vehicle relative to the control target values using the transfer function G (s) or time constant Ts of the other vehicle estimated by the host vehicle. Hence, according to this vehicle interval automatic control system, when variation occurs in the received transfer function G (s) or time constant Ts of the other vehicle, the control target values of the host vehicle can be set more accurately using the values estimated by the host vehicle, and as a result, travel control can be executed more appropriately.

In the platooning control (following travel control) according to this example, every time the control target values (the target vehicle speed, target vehicle acceleration/deceleration, and target jerk) of the other vehicle are received, the control target values of the host vehicle, such as the target vehicle speed, are set also using the transfer function G (s) or time constant Ts of the other vehicle, and travel control is performed on the host vehicle to reach the control target values. Host vehicle travel control using the transfer function G (s) or time constant Ts of the other vehicle may also be applied to the following platooning control instead of the control according to the above example. In this platooning control, vehicle interval control is executed between vehicles through model based control based on a vehicle model such that the vehicle interval matches the control target values (the target inter-vehicle distance and target inter-vehicle time). As a specific example, optimization control (LQ control) for setting a control target value (the target vehicle acceleration/deceleration) of respective vehicles is executed such that optimization is achieved in a system including two or more vehicle models.

In the LQ control, the respective control devices 10 of vehicles C1 to C5 share information relating to the vehicles C1 to C5, which is transmitted and received by wireless communication, and on the basis of the shared information, a combination of target vehicle acceleration/deceleration values $u_2$ to $u_5$ of following vehicles C2 to C5 is set. Host vehicle travel control is then performed in the respective vehicles C1 to C5 on the basis of host vehicle target vehicle acceleration/deceleration values $u_1$ to $u_5$. The transfer function G (s) or the time constant Ts is included in the shared information. Therefore, when setting the combination of the target vehicle acceleration/deceleration values $u_2$ to $u_5$, the combination is preferably set taking into account the respective transfer functions G (s) or time constants Ts of the vehicles C1 to C5. In so doing, the LQ control can be executed more appropriately in accordance with the control response characteristic of each vehicle C1 to C5, or in other words current conditions. An example of this LQ control will now be described briefly.

In this example, vehicle interval control (platooning control) executed through LQ control when five vehicles C1 to C5 shown in FIG. 2 travel in a platoon will be described. In this vehicle interval automatic control system, traveling conditions of the following vehicles C2 to C5 are controlled in accordance with the traveling conditions of a leading vehicle C1 so that the following vehicles C2 to C5 follow the leading vehicle C1, whereby the vehicles C1 to C5 travel in a platoon at a target inter-vehicle distance $L_{tgt}$. At this time, all of the various information described above relating to the host vehicle and the other vehicles, or required information included in the various information, is shared among the vehicles C1 to C5 through wireless communication. The target vehicle acceleration/deceleration values $u_2$ to $u_5$ of the following vehicles C2 to C5 are then set on the basis of the shared information, whereupon acceleration/deceleration of the following vehicles C2 to C5 is controlled to match the target vehicle acceleration/deceleration values $u_2$ to $u_5$. The shared information includes vehicle acceleration/deceleration values (actually measured values or estimated values obtained by the front-rear acceleration detection device 43 such as an acceleration sensor) $a_1$ to $a_5$ and the target vehicle acceleration/deceleration values $u_1$ to $u_5$ for the respective vehicles C1 to C5, as well as inter-vehicle distance errors $L_1$ to $L_4$ and relative speeds $L_1'$ to $L_4'$ ($dL_1/dt$ to $dL_4/dt$) between the respective vehicles arranged in series from front to rear.

In the platooning control, platooning of the vehicles C1 to C5 is represented by a time differential (Equation 3: state space equation) of a state vector x shown below using the target vehicle acceleration/deceleration values $u_2$ to $u_s$ of the following vehicles C2 to C5 as control input and the vehicle acceleration/deceleration values $a_1$ to $a_5$, the inter-vehicle distance errors $L_1$ to $L_4$, and the relative speeds $L_1'$ to $L_4'$ as state quantities.

$$x' = Ax + B_c u_c + B_0 u_0 + B_w u_w \quad (3)$$

Here, "$u_c$" in Equation 3 is a target vehicle acceleration/deceleration vector, "$u_0$" is the target vehicle acceleration/deceleration of the leading vehicle C1, and "$u_w$" denotes the road gradient or a disturbance such as wind. Further, "A", "$B_c$", "$B_0$", and "$B_w$" denote matrices determined by the specification information and so on of the respective vehicles C1 to C5. The state vector x and the target vehicle acceleration/deceleration vector $u_c$ are as follows.

$$x = (a_1, L_1, L_1', a_2, L_2, L_2', a_3, L_3, L_3', a_4, L_4, L_4', a_5)^T$$

$$u_c = (u_2, u_3, u_4, u_5)^T$$

The target vehicle acceleration/deceleration vector $u_c$ can be expressed as shown in a following Equation 4 using a feedback gain matrix K. The feedback gain matrix K according to this example is a 13 column x 4 row matrix.

$$u_C = B_{ff} u_1 + Kx \quad (4)$$

$$B_{ff} = \begin{bmatrix} 1 \\ 1 \\ 1 \\ 1 \end{bmatrix}$$

A cost function J for performing LQ control on the system represented by the state space equation shown above (Equation 3) is determined as shown in a following Equation 5.

$$J = \int \left\{ \begin{array}{l} \varepsilon_L (L_1^2 + L_2^2 + L_3^2 + L_4^2) + \\ \varepsilon_{dL} \left( \dfrac{dL_1^2}{dt} + \dfrac{dL_2^2}{dt} + \dfrac{dL_3^2}{dt} + \dfrac{dL_4^2}{dt} \right) + \\ \varepsilon_u (u_1^2 + u_2^2 + u_3^2 + u_4^2 + u_5^2) \end{array} \right\} dt \quad (5)$$

In Equation 5, "$\varepsilon_L$", "$\varepsilon_{dL}$", and "$\varepsilon_u$" are weightings for weighting terms relating to the inter-vehicle distance errors $L_1$ to $L_4$, terms relating to the relative speeds $L_1'$ to $L_4'$, and terms relating to the target vehicle acceleration/deceleration values $u_1$ to $u_5$, respectively. Hence, during the platooning control, stability in the inter-vehicle distances, reductions in the relative speeds, and reduction in the acceleration/deceleration are balanced by adjusting the weightings $\epsilon_L$, $\epsilon_{dL}$, and $\epsilon_u$.

The feedback gain matrix K for minimizing the cost function J is determined uniquely when the vehicles C1 to C5 forming the platoon are determined as a group.

In the platooning control, the target vehicle acceleration/deceleration vector $u_c$ for minimizing the cost function J is determined by substituting the feedback gain matrix K and the state vector x obtained on the basis of information from the various detection devices into Equation 4 and setting the target vehicle acceleration/deceleration $u_1$ of the leading vehicle C1 as a feedforward control value. The respective transfer functions G (s) or time constants Ts of the vehicles C1 to C5 may be used during calculation of the target vehicle acceleration/deceleration vector $u_c$, for example. Thus, a combination of target vehicle acceleration/deceleration values $u_2$ to $u_5$ for minimizing the cost function J is determined. The respective control devices 10 of the following vehicles C2 to C5 then control the respective following vehicles C2 to C5 so that acceleration/deceleration thereof matches the target vehicle acceleration/deceleration values $u_2$ to $u_5$, and as a result, the vehicles C1 to C5 travel in a platoon.

In the embodiment described above, the information pertaining to the transfer function G (s) indicates the control response characteristic of the actual vehicle acceleration/deceleration $a_{actual}$ relative to the target vehicle acceleration/deceleration $u_{target}$, but the information pertaining to the transfer function G (s) may indicate a control response characteristic of an actual output relative to a target braking/driving force (a control target value), for example. In this case, the target vehicle acceleration/deceleration $u_{target}$ and target braking/driving force of the host vehicle are set on the basis of the target braking/driving force and the information pertaining to the transfer function G (s) of the preceding vehicle. However, in this case, the target vehicle acceleration/deceleration $u_{target}$ of the preceding vehicle received through wireless communication does not always match the actual vehicle acceleration/deceleration $a_{actual}$ of the preceding vehicle, and even if the information relating to the transfer function G (s) of the host vehicle is taken into account when setting the target vehicle acceleration/deceleration $u_{target}$ and so on of the host vehicle, the vehicle acceleration/deceleration a of the host vehicle cannot match the vehicle acceleration/deceleration $a_{actual}$ of the preceding vehicle unless the information relating to the transfer function G (s) of the host vehicle is of an identical level to that of the preceding vehicle (in other words, unless the host vehicle and the preceding vehicle are models exhibiting identical or identical-level output characteristics and/or deceleration characteristics). In this case, it may be impossible to accelerate and decelerate the host vehicle in accordance with the movement of the preceding vehicle.

Hence, in this case, differences between the output characteristics and/or deceleration characteristics of the preceding vehicle and the host vehicle may be determined on the basis of the specification information (in particular, information such as the model and manufacturer) of the preceding vehicle, whereupon the target vehicle acceleration/deceleration $u_{target}$ and the target braking/driving force of the host vehicle (control target values of the host vehicle) are corrected in accordance with these differences. For example, when the host vehicle and the preceding vehicle are determined to be models exhibiting identical or identical-level output characteristics and so on, the target vehicle acceleration/deceleration $u_{target}$ and target braking/driving force of the host vehicle set using the information pertaining to the transfer function G (s) of the preceding vehicle are used (normal control). When the preceding vehicle is determined to be a model exhibiting higher output characteristics and so on than the host vehicle, on the other hand, the target vehicle acceleration/deceleration $u_{target}$ and target braking/driving force of the host vehicle set using the information pertaining to the transfer function G (s) of the preceding vehicle are corrected such that a higher acceleration or a higher output than that of the normal control is obtained during acceleration and a higher deceleration or a lower output (a higher braking force) is obtained during deceleration. Correction is performed at this time such that as the difference in the output characteristic and so on increases, a higher acceleration or a higher output is obtained during acceleration and a higher deceleration or a lower output (a higher braking force) is obtained during deceleration. Further, when the host vehicle is determined to be a model exhibiting higher output characteristics and so on than the preceding vehicle, the set target vehicle acceleration/deceleration $u_{target}$ and target braking/driving force of the host vehicle are corrected such that a lower acceleration or a lower output than that of the normal control is obtained during acceleration and a lower deceleration or a higher output (a lower braking force) is obtained during deceleration. At this time, the correction is performed such that as the difference in the output characteristic and so on increases, a lower acceleration or a lower output is obtained during acceleration and a lower deceleration or a higher output (a lower braking force) is obtained during deceleration.

During the correction process, the information pertaining to the transfer function G (s) of the preceding vehicle indicates a correct value from the viewpoint of the preceding vehicle, but from the viewpoint of the host vehicle, the value may lack reliability. Therefore, the target vehicle acceleration/deceleration $u_{target}$ and target braking/driving force corrected as described above may be calculated by comparing the specification information of the host vehicle with the specification information of the preceding vehicle and correcting the received information pertaining to the transfer function G (s) of the preceding vehicle when it is determined that the information pertaining to the transfer function G (s) lacks reliability from the viewpoint of the host vehicle.

Further, in the examples described heretofore, a function having a first order delay response characteristic is used as the transfer function G (s), as shown in Equation 1. However, a function having a second order delay response characteristic, shown in following Equations 6 and 7, or a function having a non-linear (having first order delay and dead time) response characteristic, shown in a following Equation 8, for example, may also be used as the transfer function G (s). In the transfer function G (s) of Equation 6, $\omega_n$ and $\zeta$ are time constants. In this case, the transfer function G (s) or the time constants $\omega_n$, $\zeta$ are transmitted and received through wireless communication and thereby shared among the vehicles. Further, in the transfer function G (s) of Equation 7, $\alpha_x$ (x=1, 2, ..., n, n+1) and $\beta_y$ (y=1, 2, ..., m, m+1) are time constants. In this case, the transfer function G (s) or the time constants $\alpha_x$, $\beta_y$ are transmitted and received through wireless communication and thereby shared among the vehicles. Furthermore, in the transfer function G (s) of Equation 8, L and Ts are time constants. In this case, the transfer function G (s) or the time constants L, Ts are transmitted and received through wireless communication and thereby shared among the vehicles. Note that "e" in Equation 8 is a common logarithm.

$$G(s) = \frac{\omega_n^2}{s^2 + 2\zeta\omega_n s + \omega_n^2} \quad (6)$$

$$G(s) = \frac{\beta_1 s^m + \beta_2 s^{m-1} + \cdots + \beta_m s + \beta_{m+1}}{\alpha_1 s^n + \alpha_2 s^{n-1} + \cdots + \alpha_n s + \alpha_{n+1}} \quad (7)$$

$$G(s) = e^{-Ls} \frac{1}{1 + Ts * s} \quad (8)$$

The various used transfer functions G (s) are appropriate for the control type of the travel control.

In the embodiment described above, wireless communication is used to transmit various information such as the control target values and the transfer function G (s) or the time constant to a partner. With wireless communication, however, it may not always be possible to receive information from the partner. Situations in which information cannot be received (communication breakdowns) include both communication abnormalities in which a partner communication device has difficulty transmitting information or the host communication device has difficulty receiving information from the partner, and a communication standby state in which the host waits for the partner to transmit information. During a communication breakdown determination according to this vehicle interval automatic control system, a communication abnormality is determined to have occurred when a number of information reception failures (a number per minute or the like) reaches a predetermined number within a predetermined communication period, for example. Further, during the communication breakdown determination according to this vehicle interval automatic control system, a communication standby state is determined to be established when information cannot be received for a predetermined period (several seconds or the like) even though the communication device of the host vehicle is functioning normally, for example. Note that it is not easy to detect a situation in which the partner communication device is having difficulty transmitting information on the host vehicle side, and therefore, in such situations, a communication standby state may be determined temporarily, after which a communication abnormality may be determined in accordance with the subsequent communication condition.

In the information communication type vehicle interval control described above, the control target values are set on the basis of information relating to another vehicle such as the preceding vehicle, which is received from the partner, for example. Therefore, during a communication breakdown, the other vehicle information cannot be obtained, and as a result, control target values such as the target inter-vehicle distance cannot be set. Hence, in this vehicle interval automatic control system, the information communication type vehicle interval control described above is halted during a communication breakdown, and instead, conventional vehicle interval control for controlling the interval to an immediately preceding vehicle is performed. In other words, conventional information detection type adaptive cruise control (ACC) is also executed in this vehicle interval automatic control system. In information detection type vehicle interval control, information such as the inter-vehicle distance, the relative speed, and the relative acceleration relative to the immediately preceding vehicle is measured by the nearby object detection device 30 of the host vehicle, and control target values such as a target vehicle speed are set on the basis of the measured information. Note that when the host vehicle can obtain position information relating to the preceding vehicle from a GPS, the inter-vehicle distance, or in other words the relative positional relationship between the preceding vehicle and the host vehicle, may be determined on the basis of position information relating to the preceding vehicle and position information relating to the host vehicle using the GPS.

As described above, the vehicle control system (vehicle control apparatus) according to the invention may be used as a technique for improving the control precision of travel control executed on a host vehicle in relation to another vehicle.

The invention claimed is:

1. A vehicle control system comprising:
   a communication device provided in a vehicle to receive information relating to another vehicle from outside the vehicle; and
   a control device that performs travel control of the vehicle on the basis of information pertaining to a transfer function for a control target value used during travel control of the other vehicle, wherein the information pertaining to the transfer function indicates a control response characteristic relative to the control target value of the other vehicle, and the control target value of the other vehicle, the control response characteristic is used during travel control of the other vehicle and the control target value of the other vehicle is obtained via the communication device of the vehicle.

2. The vehicle control system according to claim 1, wherein the control device performs the travel control on the vehicle on the basis of specification information relating to the other vehicle, which is obtained via the communication device.

3. The vehicle control system according to claim 1, wherein the information pertaining to the transfer function of the other vehicle is obtained via the communication device of the vehicle.

4. The vehicle control system according to claim 1, wherein the control device calculates the information pertaining to the transfer function of the other vehicle on the basis of the control target value of the other vehicle and a measured value of an actual output for the control target value.

5. The vehicle control system according to claim 4, wherein the measured value of the actual output of the other vehicle is measured by the other vehicle, and
   the vehicle obtains the measured value of the actual output of the other vehicle via the communication device of the vehicle.

6. The vehicle control system according to claim 4, further comprising a measurement device that measures the actual output for the control target value of the other vehicle.

7. The vehicle control system according to claim 1, wherein the control device performs the travel control on the basis of information pertaining to the transfer function of the vehicle.

8. The vehicle control system according to claim 1, wherein the control device calculates an actual output value for the control target value of the other vehicle using the information pertaining to the transfer function of the other vehicle and the control target value of the other vehicle, and obtains a control target value used during the travel control of the vehicle on the basis of the actual output value of the other vehicle.

9. The vehicle control system according to claim 8, wherein the control device compares specification information relating to the other vehicle, which is obtained via the communication device, and the specification information relating to the vehicle to determine a characteristic difference in output characteristics or deceleration characteristics between the vehicle and the other vehicle, and obtains the control target value of the vehicle on the basis of the characteristic difference.

10. The vehicle control system according to claim 9, wherein the control device corrects the control target value of the vehicle on the basis of the characteristic difference.

11. The vehicle control system according to claim 8, wherein the control device calculates the control target value of the vehicle using the actual output of the other vehicle and information pertaining to the transfer function of the vehicle.

12. The vehicle control system according to claim 11, further comprising a measurement device that measures an actual output for the control target value of the vehicle,
 wherein the control device calculates the information pertaining to the transfer function of the vehicle using the actual output of the vehicle and the control target value of the vehicle.

13. The vehicle control system according to claim 1, wherein the information pertaining to the transfer function is a time constant.

14. A vehicle control system comprising:
 a communication device provided in a vehicle; and
 a control device that performs travel control using information relating to another vehicle, which is received from outside the vehicle via the communication device,
 wherein the communication device transmits information pertaining to a transfer function for a control target value used during the travel control, and wherein the information pertaining to the transfer function indicates a control response characteristic relative to the control target value of the vehicle, the control response characteristic is used during travel control of the vehicle and the control device performs travel control of the vehicle on the basis of the control response characteristic used during travel control of the other vehicle.

15. The vehicle control system according to claim 14, wherein the information pertaining to the transfer function is a time constant.

\* \* \* \* \*